United States Patent [19]

Nakae et al.

[11] Patent Number: 5,089,323
[45] Date of Patent: Feb. 18, 1992

[54] OXYGEN ABSORBING SHEET

[75] Inventors: Kiyohiko Nakae, Tokyo; Toshio Kawakita, Osaka; Takanori Kume, Osaka; Masashi Sugiyama, Osaka, all of Japan

[73] Assignee: Sumitomo Chemical Co., Ltd., Osaka, Japan

[21] Appl. No.: 440,925

[22] Filed: Nov. 24, 1989

[30] Foreign Application Priority Data

Nov. 24, 1988 [JP] Japan .................................. 63-297921

[51] Int. Cl.$^5$ .................................. B32B 9/00
[52] U.S. Cl. ............................ 428/220; 428/323; 428/328; 428/411.1; 428/457; 428/461
[58] Field of Search ............ 428/220, 323, 328, 411.1, 428/457, 461

[56] References Cited

U.S. PATENT DOCUMENTS 4,780,357 10/1988 Akao .................................. 428/328

OTHER PUBLICATIONS

Chemical Abstracts, vol. 104, No. 18, May 5, 1986, p. 47, col. 1, abstract No. 150081g.
Patent Abstracts of Japan, vol. 9, No. 301 (C-316)(2024), Nov. 28, 1985.

*Primary Examiner*—Patrick J. Ryan
*Attorney, Agent, or Firm*—Sughrue, Mion, Zinn, Macpeak & Seas

[57] ABSTRACT

An oxygen absorbing sheet is disclosed, which is obtained by molding a resin composition comprising from 15 to 70% by weight of a thermoplastic resin and from 30 to 85% by weight of an oxygen absorbent into a sheet having a thickness of from 10 μm to 5 mm and stretching the sheet at least uniaxially at a stretch ratio of from 1.5 to 8.0. The oxygen absorbing sheet is easy to handle, and its oxygen absorption capacity is arbitrarily controllable.

7 Claims, No Drawings

OXYGEN ABSORBING SHEET

FIELD OF THE INVENTION

This invention relates to an oxygen absorbing sheet and, more particularly, to an oxygen absorbing sheet which is easy to handle and can have its oxygen absorption capacity controlled.

BACKGROUND OF THE INVENTION

Disoxidants, i.e., oxygen absorbents, are widely employed for oxygen removal in various fields in preservation of foods and other products in which the presence of oxygen is not desired. For example, an iron powder as disclosed in JP-A-62-234544 (the term "JP-A" as used herein means an "unexamined published Japanese patent application") has been of frequent use as an oxygen absorbent. However, a powdered oxygen absorbent, especially a fine powder, readily absorbs oxygen in air. In particular, iron-based oxygen absorbents are difficult to handle due to spontaneous combustibility.

JP-B-62-54704 (the term "JP-B" as used herein means an "examined published Japanese patent application") proposes a method of packaging a powdered oxygen absorbent with an air-permeable material. There remains a problem, however, that the powder leaks out unless it is completely sealed in. Further, since an oxygen absorbent conducts oxygen absorption from the surface of the air-permeable packaging material and undergoes reaction and hardening on the surface portion of the powder mass, it is not expected that the absorption reaction proceeds to the inside of the powder mass. As a result, oxygen absorbency cannot be manifested in proportion to the amount of the filled absorbent, thus failing to sufficiently control the rate of oxygen absorption.

JP-A-55-116436 also proposes a method of packaging an oxygen absorbent. However, this method not only encounters extreme difficulty in precisely and speedily packaging a small amount of an oxygen absorbent but also requires an expensive automatic filling and packaging machine. In addition, since such packaged oxygen absorbents are packed together with foods in many cases, cases may occur in which the oxygen absorbent is eaten by mistake.

Oxygen absorbents of sheet type include a sheet prepared from a blend of an activated iron oxide oxygen absorbent and a thermoplastic resin, e.g., polyethylene, as disclosed in JP-A-55-44344; a porous sheet or film base with its pores filled with an oxygen absorbent as disclosed in JP-A-55-109428; and a foamed polyurethane sheet having continuous cells in which an oxygen absorbent powder is buried as disclosed in JP-A-60-183373.

However, the oxygen absorbent of the sheet type comprising a thermoplastic resin and an oxygen absorbent does not always exhibit sufficient oxygen absorbency. Further, the oxygen absorbent made of porous sheet or film base has disadvantages in that the absorbent filled in pores of the porous base is easily released if so handled, and provision of an air-permeable film for prevention of such a release increases the cost. Furthermore, the oxygen absorbent made of foamed polyurethane sheet has disadvantages that it is difficult to stably obtain a continuous cellular structure on an industrial scale, and materials per se are too expensive for practical use.

SUMMARY OF THE INVENTION

An object of this invention is to provide an oxygen absorbing sheet which is easy to handle, causes no leakage of an oxygen absorbent, can have its oxygen absorption capacity arbitrarily controlled, requires no technically delicate step of filling and packaging, and cannot be being eaten by mistake.

The present inventors have conducted extensive investigations on an oxygen absorbing sheet which is easy to handle and causes no leakage of an oxygen absorbent, and whose oxygen absorption capacity can be controlled arbitrarily and, as a result, it has now been found that the above object of this invention is accomplished by mixing an oxygen absorbent and a thermoplastic resin, molding the mixture in a molten state to obtain a film, and stretching the film under specific conditions. The present invention has been completed based on this finding.

This invention relates to an oxygen absorbing sheet obtained by molding a resin composition comprising from 15 to 70% by weight of a thermoplastic resin and from 30 to 85% by weight of an oxygen absorbent into a sheet having a thickness of from 10 μm to 5 mm and stretching the sheet at least uniaxially at a stretch ratio of from 1.5 to 8.0.

The oxygen absorbing sheet of this invention is characterized by its small voids (microvoids) formed by stretching a film or sheet comprising a thermoplastic resin shaving uniformly dispersed therein an oxygen absorbent by melt-kneading under specific stretching conditions. In the stretched sheet, since the uniformly dispersed oxygen absorbent is in contact with air through the microvoids, it effectively absorbs oxygen in air.

DETAILED DESCRIPTION OF THE INVENTION

Oxygen absorbents which can be used in the present invention preferably include an iron powder and a mixture of an iron powder and an electrolyte, with the latter being more preferred.

An iron powder usually contains from 0.1 to 20% by weight of iron-based secondary components, such as iron carbide and iron oxides, chiefly on its surface. The iron powder usually has a particle size of from 0.1 to 100 μm, preferably from 1 to 50 μm. Too large a particle size not only decreases the specific surface area to reduce oxygen absorption but makes it impossible to form a thin film. On the other hand, too small a particle size deteriorates dispersibility in a thermoplastic resin. Moreover, a fine iron powder is not easily available in an industrially stable form.

The iron powder usually has a specific surface area of 1000 $cm^2/g$ or more, preferably 5000 $cm^2/g$ or more. Accordingly, the most suitable shape of the iron powder is a porous or nearly porous shape.

Electrolytes which can be used in the present invention function to accelerate the rate of oxygen absorption of an iron powder and include halides, carbonates, sulfates, and hydroxides. Preferred of them are halides, with calcium chloride, sodium chloride, and magnesium chloride being more preferred. The electrolyte is preferably used as adhered or coated on the iron powder surface, but may be used as a mere blend with the iron powder.

The electrolyte is preferably used in an amount of from 0.1 to 10% by weight based on the sum of the weights of the iron powder and the electrolyte. Where it is used as adhered or coated on the iron powder surface, the most practical amount ranges from 0.1 to 5% by weight. If the amount of the electrolyte exceeds 10% by weight, the oxygen absorbing sheet excessively absorbs moisture, gets wet with water and loses a commercial value.

The oxygen absorbing sheet according to this invention is characterized by ease in handling because it does not absorb substantial oxygen at low humidity but absorbs oxygen in the presence of a sufficient water content, for example, in air having a relative humidity of 50% or higher.

The oxygen absorbing sheet of the invention comprises from 30 to 85% by weight of the above-described oxygen absorbent. If the content of the oxygen absorbent is less than 30% by weight, formation of microvoids is insufficient so that those microvoids connecting to the atmosphere are reduced in number. As a result, the oxygen absorption capacity in the atmosphere becomes too low to be of practical use. On the other hand, if the content exceeds 85% by weight, the resulting sheet is considerably brittle and not suitable for practical use.

Thermoplastic resins which can be used in the present invention include low-density branched polyethylene obtained by the high-pressure process, copolymers of ethylene and an α-olefin having from 4 to 12 carbon atoms, high-density polyethylene, random or block copolymers of ethylene and/or butene-1 and propylene, propylene homopolymers, copolymers of ethylene and vinyl acetate and/or a (meth)acrylic ester, metal salts of copolymers of ethylene and acrylic acid, and mixtures of two or more thereof. Preferred among them are copolymers of ethylene and an α-olefin having from 4 to 12 carbon atoms, random or block copolymers of ethylene and/or butene-1 and propylene, copolymers of ethylene and vinyl acetate and/or a (meth)acrylic ester, and metal salts of copolymers of ethylene and acrylic acid. More preferred are copolymers of ethylene and an α-olefin having from 4 to 12 carbon atoms which have a density of from 0.870 to 0.915 g/cm$^3$ and contain from 18 to 45% by weight of a xylene extractable content (at 25° C.) whose weight average molecular chain length ranges from 1000 to 9000 Å hereinafter referred to as very low-density polyethylene) and a thermoplastic resin containing at least 10% by weight of the very low-density polyethylene. The thermoplastic resin containing at least 10% by weight of very low-density polyethylene exhibits satisfactory dispersibility on melt-kneading with an oxygen absorbent to provide a sheet which can be stretched at a high stretch ratio with excellent stretchability.

The very low-density polyethylene can be prepared by known techniques as described, e.g., in JP-A-56-99209 and JP-A-59-230011.

The thickness of an unstretched sheet comprising the thermoplastic resin and the oxygen absorbent varies depending on the end use, but usually ranges from 10 μm to 5 mm. If it is less than 10 μm, cases are met in which an extremely large area of an oxygen absorbing sheet must be used in order to obtain a desired oxygen absorption capacity. This being the case, the oxygen absorbing sheet would stand out prominently from the content, e.g., foods, of packages. On the other hand, if it exceeds 5 mm, uniform heating of the sheet for stretching is difficult, failing to conduct uniform stretching, or a stretching stress becomes so high that stretching cannot be carried out with an ordinary stretching device.

The sheet comprising the thermoplastic resin and the oxygen absorbent is then stretched at a stretch ratio of from 1.5 to 8.0. If the stretch ratio is less than 1.5, formation of microvoids is insufficient, and the uniformly dispersed oxygen absorbent cannot be brought into sufficient contact with air, resulting in a failure of attaining an oxygen absorption capacity sufficient for practical use. If the stretch ratio exceeds 8.0, the resulting stretched sheet has seriously reduced film strength, such as tear strength, and is easily broken on application of a slight outer force and, therefore, is unsuitable for practical use. The stretching temperature is set at a temperature lower than the melting point of the thermoplastic resin by at least 5° C. For example, in using polyolefin resins, stretching is usually carried out at a temperature of from room temperature to about 70° C.

If desired, the composition for obtaining an oxygen absorbing sheet of the present invention may further comprise additives, such as antioxidants, dispersing agents, antistatic agents, deodorizers, and bactericides, in such amounts that do not substantially affect the effects of the present invention.

An example of methods for producing the oxygen absorbing sheet according to the present invention are illustrated below.

A thermoplastic resin and an oxygen absorbent are mixed or kneaded in a usual manner by means of rolls, a Banbury mixer, or a single-screw or twin-screw extruder to prepare a composition. The composition is molded in a usual manner, for example, blown-film extrusion, calendering, or T-die extrusion, to obtain a film or a sheet, which is then stretched uniaxially or biaxially. Uniaxial stretching is preferably effected by roll stretching or may be effected by tubular stretching. Biaxial stretching may be performed by simultaneous biaxial stretching or successive biaxial stretching comprising longitudinal stretching followed by transverse stretching.

Thus, the oxygen absorbing sheet of the present invention is produced through two steps: film or sheet formation from the resin composition comprising a thermoplastic resin and an oxygen absorbent, and stretching of the film or sheet. These two steps may be conducted either separately or continuously.

The present invention is now illustrated in greater detail by way of the following examples, but it should be understood that the present invention is not deemed to be limited thereto. In these examples, all the percents and parts are given by weight unless otherwise indicated.

In the Examples and Comparative Examples, various physical properties were measured as follows.

1) Rate of Oxygen Absorption:

An oxygen absorbing sheet weighing 3.7 g per liter of air was placed in a sealed container. An average rate of oxygen absorption (cm$^3$/hr) was obtained by measuring the amount of oxygen absorbed within the initial 4 hours. The sealed container used is a graduated glass cylinder standing upright on a water surface, which is so designed that the water level rises by the volume corresponding to the volume of oxygen absorbed.

2) Weight Average Molecular Chain Length:

A weight average molecular chain length of a xylene extractable content at 25° C. (hereinafter referred to as cold xylene soluble content, abbreviated as CXS) was determined by gel permeation chromatography (GPC) under the following conditions:
  Chromatograph: "Model 811" manufactured by Tosoh Corporation
  Column: GMH 6-HD (two columns)
  Measurement Temperature: 130° C.
  Standard: polystyrene
3) Density:
Densities of resins were measured at 23° C. by means of a density-gradient tube in accordance with JIS K6760-1981.
4) Melt Flow Rate (MFR):
Measured in accordance with JIS K6760-1981.
5) Specific Surface Area:
A sample weighing about 0.3 g was put in an adsorption sample tube and heated at 200° C. for 20 minutes in a stream (30 ml/min) of a mixed gas comprising 30 vol% of nitrogen and 70 vol% of helium. After being allowed to cool, the sample tube was placed in liquid nitrogen at about $-196°$ C., and the nitrogen gas adsorption was obtained as an adsorption (V) at 22° C. under 1 atm. The adsorption V was inserted to equation shown below which was obtained by approximation of BET equation to calculate a total surface area (St; m$^2$) of the sample.

$$St = 2.84 \times V$$

A specific surface area (S; m$^2$/g) wa obtained by dividing the total surface area (St) by the weight of the sample (W) [S=St/W].

EXAMPLE 1

Twenty-five percent of an ethylene-butene-1 copolymer as a linear low-density polyethylene (CXS content: 21%; weight average molecular chain length of CXS: 3700 Å; density: 0.900 g/cm$^3$; MFR: 1.8 g/10 min) (hereinafter referred as A-1), 75% of an iron powder (average particle size: 40 μm; specific surface area; 90000 cm$^2$/g) comprising 85% of Fe, 9% of Fe$_3$C and 6% of FeO and containing, as an electrolyte, 1% of calcium chloride, and 1.0 part, per 100 parts of the resin composition (i.e., A-1 plus iron powder), of zinc stearate as a dispersing agent were previously mixed in a tumbler mixer "Model MT 50" (manufactured by Morita Seiki K.K.). The mixture was further kneaded in a Banbury mixer "Model BR" (manufactured by Kobe Steel, Ltd.) at 120° to 150° C. for 5 minutes.

The resulting compound was kneaded in a 65 mmφ extruder (manufactured by Minami Senju Seisakusho K.K.) and extruded from a T-die (die width: 700 mm; lip clearance: 0.7 mm) to obtain a 1 mm thick sheet (extrusion temperature: 250° C. at cylinder 1; 280° C. at cylinders 2 and 3, head, and die).

The sheet was stretched 3.2 times at 60° C. in the machine direction using stretching rolls manufactured by The Japan Steel Works, Ltd. to produce an oxygen absorbing sheet.

The resulting oxygen absorbing sheet had a rate of oxygen absorption of 12.0 cm$^3$/hr as shown in Table 2, which level is sufficient for practical use as an oxygen absorbent. This oxygen absorbing sheet absorbed substantially no oxygen at a low humidity but absorbed oxygen in the presence of a sufficient water content. Thus, it was very easy to handle not only from its shape but in view of function controllability. Further, no released of the oxygen absorbent from the base sheet was observed.

The linear low-density polyethylene A-1 used here was prepared as follows.

Titanium trichloride having been crystallized together with aluminum chloride (TiCl$_3$.1/3AlCl$_3$) and vanadium trichloride were charged in an atomic ratio of titanium to vanadium of 1/1 in a discontinuous ball mill and co-ground for 2 hours to prepare a catalyst. The catalyst was dispersed in methylcyclohexane at a concentration of 2.5 g/l. Separately, triethylaluminum was dissolved in methylcyclohexane at a concentration of 4.8 g/l.

To a 0.6 l-volume autoclave was fed a compressed mixed gas comprising 45.055 mol% of ethylene, 54.845 mol% of butene-1, and 0.1 mol% of hydrogen at 50° C., and the above-prepared two kinds of catalysts were simultaneously fed to conduct a continuous polymerization reaction at a final temperature of 200° C. and a final pressured of 600 kg/cm$^2$. The average retention time of the catalysts in the autoclave was about 5 minutes.

EXAMPLES 2 TO 6

An oxygen absorbing sheet was produced in the same manner as in Example 1, except for using each of the thermoplastic resin composition shown in Table 2 below and changing the stretching conditions as shown in Table 2. The linear low-density polyethylene (A) used are shown in Table 1 below.

The resulting oxygen absorbing sheets exhibited excellent performance as shown in Table 2. Similarly to Example 1, these sheets were excellent in ease of handling, and no release of the oxygen absorbent from the base sheet was observed.

TABLE 1

| No. | CXS Content Weight Average Molecular Chain Length (Å) | Content (wt %) | Density (g/cm$^3$) | Melt Flow Rate (g/10 min) | Kind of α-Olefin |
|---|---|---|---|---|---|
| A-1 | 3700 | 21 | 0.900 | 1.8 | butene-1 |
| A-2 | 3500 | 18 | 0.906 | 2.4 | hexene-1 |
| A-3 | 4000 | 45 | 0.889 | 0.6 | butene-1 |

COMPARATIVE EXAMPLES 1 TO 4

An oxygen absorbing sheet was produced in the same manner as in Example 1, except for using each of the resin compositions shown in Table 2 and changing the stretching conditions as shown in Table 2.

The oxygen absorbing sheets of Comparative Examples 1 to 3 exhibited no or substantially no oxygen absorption performance, and the resin composition of Comparative Example 4 failed to provide a stretched sheet.

TABLE 2

| Ex. No. | Thermoplastic Resin Composition | | | | | Oxygen Absorbent (wt %) | Sheet Thickness (mm) | Stretching Condition | | Sheet Basis Weight (g/m$^2$) | Oxygen Absorption Rate (cm$^3$/hr) |
|---|---|---|---|---|---|---|---|---|---|---|---|
| | A*$^1$ (wt %) | B*$^2$ (wt %) | C*$^3$ (wt %) | D*$^4$ (wt %) | E*$^5$ (wt %) | | | Stretch Ratio | Tem. (°C.) | | |
| Ex. 1 | A-1 25 | — | — | — | — | 75 | 1.0 | 3.2 | 60 | 400 | 12.0 |

TABLE 2-continued

| Ex. No. | Thermoplastic Resin Composition | | | | | Oxygen Absorbent (wt %) | Sheet Thickness (mm) | Stretching Condition | | Sheet Basis Weight (g/m²) | Oxygen Absorption Rate (cm³/hr) |
|---|---|---|---|---|---|---|---|---|---|---|---|
| | A*1 (wt %) | B*2 (wt %) | C*3 (wt %) | D*4 (wt %) | E*5 (wt %) | | | Stretch Ratio | Tem. (°C.) | | |
| Ex. 2 | A-1 20 | — | 5 | — | — | 75 | 1.0 | 2.8 | 60 | 410 | 12.0 |
| Ex. 3 | A-1 10 | 10 | 5 | — | — | 75 | 1.0 | 2.8 | 70 | 410 | 12.5 |
| Ex. 4 | A-2 25 | — | — | — | — | 75 | 1.0 | 3.0 | 60 | 400 | 12.5 |
| Ex. 5 | A-3 15 | — | — | 10 | — | 75 | 1.0 | 3.5 | 60 | 390 | 12.0 |
| Ex. 6 | A-3 10 | — | — | — | 15 | 75 | 1.0 | 3.5 | 30 | 410 | 11.0 |
| Ex. 7 | A-1 20 | — | — | — | — | 80 | 1.0 | 3.0 | 60 | 400 | 12.0 |
| Ex. 8 | A-1 45 | — | — | — | — | 55 | 1.0 | 5.0 | 60 | 350 | 10.0 |
| Ex. 9 | A-2 80 | — | — | — | — | 20 | 1.0 | 7.0 | 60 | 160 | 6.0 |
| Com. Ex. 1 | A-1 80 | — | — | — | — | 20 | 1.0 | 3.0 | 60 | 400 | 1.5 |
| Com. Ex. 2 | A-1 25 | — | — | — | — | 75 | 1.0 | 1.2 | 60 | 400 | 0.2 |
| Com. Ex. 3 | A-1 20 | — | 5 | — | — | 75 | 1.0 | not stretched | | — | 0 |
| Com. Ex. 4 | A-1 10 | — | — | — | — | 90 | 1.0 | *7 | | — | — |

Note:
*1 See Table 1.
*2 Linear low-density polyethylene; MFR = 2.7 g/10 min; density = 0.923 g/cm³; CXS content = 3% (prepared by the process described in JP-A-56-99209)
*3 Branched low-density polyethylene; MFR = 1.5 g/10 min; density = 0.922 g/cm³ ("Sumikathene ® F208-O" produced by Sumitomo Chemical Company, Limited)
*4 Butene-1-propylene random copolymer; MFR = 3 g/10 min; butene-1 content = 21% (prepared by the process described in JP-A-60-127133)
*5 Methyl methacrylate-ethylene copolymer; MFR = 7 g/10 min; methyl methacrylate content = 15% ("Acrift ® WH 302" produced by Sumitomo Chemical Company, Limited)
*6 Iron powder (average particle size: 40 μm; specific surface area: 90000 cm²/g) containing about 1% of calcium chloride as an electrolyte.
*7 The sheet could not be stretched due to brittleness.

as described above, an oxygen absorbing sheet which is easy to handle, suffers from no leakage of an oxygen absorbent, requires no step of filling and packaging, and is not eaten by mistake, and whose oxygen absorption capacity arbitrarily controllable can be obtained by subjecting a resin composition comprising a specific thermoplastic resin and a specific oxygen absorbent in a specific proportion to stretching at a specific stretch ratio. An especially remarkable effect of the present invention is that use of a specific oxygen absorbent permits free handling in the atmosphere without a fear of undesired oxygen absorption from sheet processing through actual use.

These effects are attributed to uniform dispersion of the specific oxygen absorbent in the specific thermoplastic resin and formation of a number of microvoids connecting to the atmosphere at the interface between the oxygen absorbent and the thermoplastic resin matrix through stretching at a specific stretch ratio, which provides a significantly increased surface area of the oxygen absorbent exposed to the atmosphere.

These effects of the oxygen absorbing sheet according to the present invention can be made use of in packages of processed foods including high water content foods and general foods, fruits, vegetables, flowers, machine parts, medicines, and the like. The oxygen absorbing sheet of the invention can also be used in combination with other base materials according to use.

While the invention has been described in detail an with reference to specific embodiments thereof, it will be apparent to one skilled in the art that various changes and modifications can be made therein without departing from the spirit and scope thereof.

What is claimed is:

1. An oxygen absorbing sheet obtained by molding a resin composition comprising:

(a) from 15 to 70% by weight of a thermoplastic resin comprising a copolymer of ethylene and an α-olefin having from 4 to 12 carbon atoms, said copolymer having a density of from 0.870 to 0.915 g/cm³, containing from 18 to 45% by weight of xylene extractable content at 25° C., and having a weight average molecular chain length from 1000 to 9000 Å; and (b) from 30 to 85% by weight of an oxygen absorbent comprising from 90 to 99.9% by weight of an iron powder having a particle size of from 0.1 to 100 μm, a specific surface area of 1000 cm²/g or more, and from 0.1 to 10% by weight of an electrolyte, in which the electrolyte is adhered on the surface of the iron powder; into a sheet having a thickness of from 10 μm to 5 mm, and stretching the sheet at least uniaxially at a stretch ratio of from 1.5 to 8.0.

2. An oxygen absorbing sheet as claimed in claim 1 wherein said iron powder has a particle size of from 1 to 50 μm.

3. An oxygen absorbing sheet as claimed in claim 1 wherein said iron powder has a specific surface area of 5000 cm²/g or more.

4. An oxygen absorbing sheet as claimed in claim 1 wherein said electrolytes are selected from the group consisting of halides, carbonates, sulfates, and hydroxides.

5. An oxygen absorbing sheet as claimed in claim 4, wherein said electrolyte is calcium chloride, sodium chloride, or magnesium chloride.

6. An oxygen absorbing sheet as claimed in claim 1 wherein said electrolyte is blended with the iron powder.

7. An oxygen absorbing sheet as claimed in claim 1 wherein said electrolyte is present in an amount of 0.1 to 5% by weight.

* * * * *